(12) United States Patent
Nukala et al.

(10) Patent No.: US 9,031,033 B2
(45) Date of Patent: May 12, 2015

(54) WIRELESS RADIO ACCESS NETWORK CONTROL CHANNEL CAPACITY MANAGEMENT

(75) Inventors: Gaurav R. Nukala, Sunnyvale, CA (US); Venkatasubramanian Ramasamy, San Jose, CA (US); Giri Prassad Deivasigamani, San Jose, CA (US)

(73) Assignee: Apple Inc., Cupertino, CA (US)

( * ) Notice: Subject to any disclaimer, the term of this patent is extended or adjusted under 35 U.S.C. 154(b) by 63 days.

(21) Appl. No.: 13/246,810

(22) Filed: Sep. 27, 2011

(65) Prior Publication Data
US 2013/0077597 A1    Mar. 28, 2013

(51) Int. Cl.
| | |
|---|---|
| H04W 72/04 | (2009.01) |
| H04W 92/00 | (2009.01) |
| H04B 7/04 | (2006.01) |
| H04L 1/00 | (2006.01) |
| H04L 5/00 | (2006.01) |

(52) U.S. Cl.
CPC ............ *H04B 7/0452* (2013.01); *H04B 7/0417* (2013.01); *H04L 1/001* (2013.01); *H04L 1/007* (2013.01); *H04L 1/0072* (2013.01); *H04L 5/0023* (2013.01); *H04L 5/0053* (2013.01)

(58) Field of Classification Search
CPC .. H04B 7/0421; H04B 7/0417; H04B 7/0452; H04L 1/0072; H04L 1/001; H04L 1/007; H04L 1/0026; H04L 5/0053; H04L 5/0023; H04W 24/10

USPC .......... 370/328–337, 431–465; 455/450–454, 455/462–464, 562.1; 375/259–285, 375/316–352

See application file for complete search history.

(56) References Cited

U.S. PATENT DOCUMENTS

| | | | |
|---|---|---|---|
| 7,706,824 B2 * | 4/2010 | Schulist et al. | 455/517 |
| 7,907,677 B2 | 3/2011 | Li et al. | |
| 8,320,479 B2 * | 11/2012 | Balachandran et al. | 375/260 |

(Continued)

FOREIGN PATENT DOCUMENTS

| | | |
|---|---|---|
| WO | WO 2009/012594 | 9/2007 |
| WO | WO 2010/060467 | 8/2010 |

(Continued)

OTHER PUBLICATIONS

"LTE in a Nutshell: The Physical Layer" Telesystems Innovations Inc., 2001.*

(Continued)

*Primary Examiner* — Melvin Marcelo
*Assistant Examiner* — Kenneth P Hunt
(74) *Attorney, Agent, or Firm* — Fay Kaplun & Marcin, LLP

(57) ABSTRACT

Transmission capacity for a control channel sent to multiple mobile wireless devices in a wireless network is increased by transmitting the control channel using multi user multiple input multiple output transmissions (MU MIMO). Received signal quality measured at mobile wireless devices in a radio sector are communicated to a radio node and used to determine one or more sets of mobile wireless devices to share transmission of control channel elements on the same time and frequency resource element. The radio node indicates the use of MU MIMO and the selection of precoding matrices to each of the mobile wireless devices in the each set of mobile wireless devices.

22 Claims, 10 Drawing Sheets

(56) References Cited

U.S. PATENT DOCUMENTS

| | | | |
|---|---|---|---|
| 2007/0223422 A1 | 9/2007 | Kim et al. | |
| 2008/0232322 A1* | 9/2008 | Heo et al. | 370/330 |
| 2010/0035555 A1* | 2/2010 | Bala et al. | 455/63.1 |
| 2010/0150090 A1* | 6/2010 | Park et al. | 370/329 |
| 2010/0215108 A1 | 8/2010 | Balachandran et al. | |
| 2011/0002227 A1* | 1/2011 | Sampath et al. | 370/248 |
| 2011/0134850 A1 | 6/2011 | Kishigami et al. | |
| 2012/0207099 A1* | 8/2012 | Lindh et al. | 370/329 |

FOREIGN PATENT DOCUMENTS

| | | | |
|---|---|---|---|
| WO | WO 2011/099765 A2 | | 8/2011 |
| WO | WO 2012155590 A1 | * | 11/2012 |

OTHER PUBLICATIONS

Alcatel-Lucent, et al: "PDCCH Enhancement in Rel-11", 3GPP Draft; R1-112421 PDCCH Enhancement Final, 3$^{rd}$ Generation Partnership Project (3GPP), Mobile Competence Centre; 650, Route Des Lucioles; F-06921 Sophia-Antipotis Cedex; France, vol. RAN WG1, no. Athens, Greece; Aug. 22, 2011, Aug. 18, 2011, XP050537815, [retrieved on Aug. 18, 2011]the whole document.

"3rd Generation Partnership Project; Technical Specification Group Radio Access Network; Evolved Universal Terrestrial Radio Access (E-UTRA); Physical layer procedures (Release 9)," 3GPP TS 36.213 V9.2.0, Jun. 2010.

Zyren, "Overview of the 3GPP Long Term Evolution Physical Layer," Freescale Semiconductor, Jul. 2007.

"LTE; Evolved Universal Terrestrial Radio Access (E-UTRA); Physical layer procedures, (3GPP TS 36.213 version 10.1.0 Release 10)," ETSI TS 136 213 V10.1.0, Apr. 2011.

"Long Term Evolution (LTE): Overview of LTE Air-Interface," Motorola, Inc., 2007.

Lee et al., "MIMO Technologies in 3GPP LTE and LTE-Advanced," Hindawi Publishing Corporation, EURASIP Journal on Wireless Communications and Networking, vol. 2009, Article ID 302092, Feb. 13, 2009.

* cited by examiner

WIRELESS RADIO ACCESS NETWORK CONTROL CHANNEL CAPACITY MANAGEMENT

TECHNICAL FIELD

The described embodiments generally relate to methods and apparatuses for control channel communication between mobile wireless devices and a wireless network. More particularly, the present embodiments describe increasing capacity of a control channel between a radio access portion of a wireless network a multiple mobile wireless devices using multi-user multiple-input multiple-output communication.

BACKGROUND

Wireless networks continue to evolve to support new services and increased transmission rates as new communication technologies develop and standardize. A representative wireless network for a wireless network service provider can include support for one or more releases of the Third Generation Partnership Project (3GPP) Long Term Evolution (LTE) wireless communication standard and LTE-Advanced wireless communication standard. This representative wireless network can support packet switched connections (voice or data) through an LTE or LTE-Advanced network.

An LTE (LTE-Advanced) wireless network can support high rate packet communication to multiple mobile wireless devices simultaneously within a geographic area. The radio frequency spectrum used for communication to the multiple mobile wireless devices can be shared among the multiple mobile wireless devices using an orthogonal frequency division multiplexing (OFDM) transmission method. A transceiver (transmitter/receiver) in a mobile wireless device can adapt to radio frequency spectral variation using the OFDM transmission method, which can divide the occupied radio frequency spectrum into a set of parallel narrower bandwidth and lower data rate communication sub-channels transmitted on parallel subcarriers, and each sub-channel can experience approximately flat frequency spectrum fading. An OFDM communication system can divide transmissions into a series of successive OFDM symbols in time, with each OFDM symbol providing multiple sub-channels centered at different frequencies simultaneously. A transmission "resource element" (RE) can be considered a unit of transmission capacity on a single sub-channel within a single OFDM symbol, and the wireless network can allocate multiple RE across multiple sub-channels among multiple wireless devices dynamically over time. The wireless network can regularly broadcast control information about the allocation of the RE to the multiple wireless devices within a geographic area served by a radio frequency access system of the wireless network. The control information itself can be transmitted using a subset of the total available RE, and the number of RE available to support communication of control information can limit the total number of mobile wireless devices that can be connected simultaneously to the wireless network.

Communication systems can be sensitive to errors that can occur in the control information received at the wireless devices, and the wireless network can use different rates of error correction coding to protect the control information during transmission and reception by the mobile wireless device in the presence of noise and interference. Received signal quality at a mobile wireless device can vary significantly based on the location of the mobile wireless device with respect to a transmitting radio frequency access system located in an access network portion of the wireless network and also based on the amount of noise and interference received by the mobile wireless device. Mobile wireless devices located at a greater distance, such as nearer the edge of a geographic coverage area of the access network transmitter, can receive weaker signals than mobile wireless devices located closer to the access network transmitter. As the control information can be broadcast simultaneously to all of the multiple wireless devices served by the access network transmitter, the transmit power used for control channel transmissions can be the same for the different multiple wireless devices, while the amount of error correction coding applied can be varied to better protect transmissions to the different mobile wireless devices. Specifically more RE can be allocated for communication of control information to mobile wireless devices with lower received signal quality, and fewer RE can be allocated to control channel messages sent to mobile wireless devices with higher received signal quality. The same RE can be allocated to multiple mobile wireless devices by sharing the same frequency band/time slot occupied by the RE using a form of spatial division multiplexing. Multi-user multiple input multiple output (MU-MIMO) transmission methods can be applied to transmissions of the control information to share selected RE among multiple mobile wireless devices and to increase the total number of mobile wireless devices that can be simultaneously supported by a radio sector of the wireless network.

SUMMARY OF THE DESCRIBED EMBODIMENTS

In one embodiment, a method of increasing transmission capacity for a control channel in a wireless network is described. The method includes at least the following steps. In a first step, a radio node in a radio access network of the wireless network estimates a received downlink signal quality for each mobile wireless device in a plurality of mobile wireless devices connected to the radio node. The radio node selects a first set of mobile wireless devices in the plurality of mobile wireless devices. Each selected mobile wireless device has an estimated downlink signal quality exceeding a first threshold. The radio node transmits simultaneously to the first set of mobile wireless devices on the control channel through a plurality of antennas using multi-user (MU) multiple-input multiple-output (MIMO) transmission. In a representative embodiment, the radio node assigns at least two mobile wireless devices in the first set of mobile wireless devices to a first control channel element that occupies a first set of time and frequency resource elements in a transmission time interval. The transmission capacity of the control channel is limited by the number of control channel elements scheduled for each transmission time interval.

In another embodiment, a mobile wireless device including a receiver and a configurable processor is described. The receiver is configured to receive and decode signals transmitted on a first control channel. The receiver is also configured to receive an indicator transmitted on a separate second control channel. The transmitted indicator indicates when transmissions on the first control channel are encoded using MU MIMO transmission. The receiver is further configured to switch decoding of signals received on the first control channel between using and not using MU MIMO transmission based on the indicator. The processor is configured to calculate a downlink signal quality for transmissions received from a radio node in a wireless network. The processor is also configured to transmit the calculated downlink signal quality using channel quality indicators to the radio node in the wireless network. The wireless network determines to use MU MIMO transmission on the first control channel based at least in part on the communicated calculated downlink signal quality.

In a further embodiment, non-transitory computer program product encoded in a non-transitory computer readable medium for increasing transmission capacity for a control channel in a wireless network is described. The non-transitory computer program product in a radio node in a radio access network of the wireless network includes the following non-transitory computer program code. Non-transitory computer program code for estimating a received downlink signal quality for each mobile wireless device in a plurality of mobile wireless devices connected to the radio node. Non-transitory computer program code for selecting a first set of mobile wireless devices in the plurality of mobile wireless devices, each selected mobile wireless device having an estimated downlink signal quality exceeding a first threshold. Non-transitory computer program code for transmitting simultaneously to the first set of mobile wireless devices on the control channel through a plurality of antennas using multi-user (MU) multiple-input multiple-output (MIMO) transmission.

Although described in terms of an LTE or LTE-Advanced network, the embodiments disclosed herein can be extended to other wireless networks that can support multi-user multiple-input multiple-output transmissions as well.

BRIEF DESCRIPTION OF THE DRAWINGS

The described embodiments and the advantages thereof may best be understood by reference to the following description taken in conjunction with the accompanying drawings.

DETAILED DESCRIPTION OF SELECTED EMBODIMENTS

Figure 1:
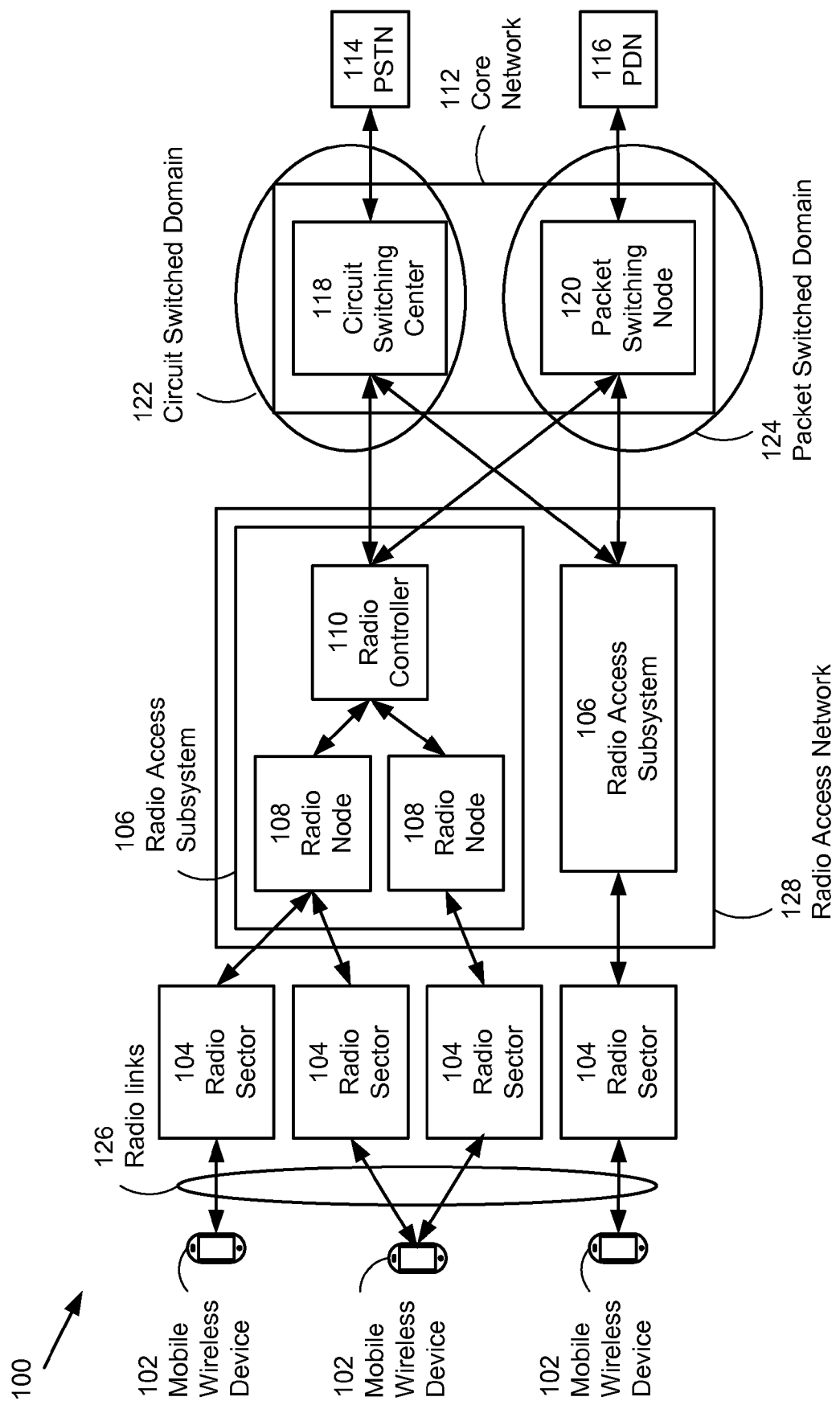
FIG. 1 illustrates components of a generic wireless communication network.

In the following description, numerous specific details are set forth to provide a thorough understanding of the concepts underlying the described embodiments. It will be apparent, however, to one skilled in the art that the described embodiments may be practiced without some or all of these specific details. In other instances, well known process steps have not been described in detail in order to avoid unnecessarily obscuring the underlying concepts.

The examples and embodiments provided below describe various methods and apparatuses for increasing control channel capacity in a wireless network for communication with multiple wireless mobile devices. More specifically, methods and apparatuses are described that use multi-user multiple-input multiple-output (MU MIMO) transmission in an LTE network. It should be understood, however, that other implementations of the same methods and apparatuses can apply to mobile wireless devices used in other types of wireless networks that support MU MIMO transmission.

Mobile wireless devices continue to evolve and offer more advanced features that can benefit from higher data throughput rates. The 3GPP LTE and LTE-Advanced communication protocols standardize packet communication to provide a broad variety of services varying from high speed data to basic voice communication. The LTE protocols use a flexible communication method known as orthogonal frequency division multiplexing (OFDM) that divides the occupied frequency spectrum into multiple parallel low rate sub-channels. A downlink transmitted OFDM symbol can contain information intended for multiple users by assigning different sub-channels to different users in the OFDM symbol. Assignments of individual sub-channels for one or a set of OFDM symbols can be communicated using a control channel broadcast to all wireless mobile devices connected to a particular radio sector of a radio access subsystem in a wireless network. As the performance of a mobile wireless device can be particularly sensitive to errors on a control channel, on which errant control message can affect multiple data packets, the control channel can be protected using various levels of error correction capability. Mobile wireless devices that are located in areas of weak signal quality can require greater levels of error protection for the control channel than those mobile wireless devices with strong signal quality. Higher levels of error protection can require more bandwidth to communication the same amount of information; and thus, mobile wireless devices having weaker signal quality can require greater allocations of control channel resources. The total number of control channel resources for allocation among all mobile wireless devices simultaneously served by the radio access subsystem within a geographical area covered by a radio sector can be limited in number. As such, the total number of mobile wireless devices that can be served simultaneously can be limited by the total amount of control channel resources available.

The LTE and LTE-Advanced communication protocols include provisions for transmission and reception of signals between the radio access subsystem and the mobile wireless device using multiple antennas. Transmission techniques known as multiple-input multiple-output (MIMO) can be used to increase the capacity and/or improve the reliability of transmission. One MIMO transmission technique known as spatial multiplexing can allow control channel communication to be shared among multiple users on the same sub-channels in the same OFDM symbol, i.e. to re-use the same frequency/time resources for multiple independent mobile wireless devices. Transmissions to one mobile wireless device can be separated by transmission to another mobile wireless device by sending the transmissions on multiple antennas at the same time and in the same frequency band. The different transmissions can be separated from one another by each receiver in the mobile wireless devices by using multiple receive antennas and sophisticated signal processing techniques. Transmissions to other mobile wireless devices can be considered "noise" with respect to the "signal"

transmission intended for a particular mobile wireless device. The receiver in the mobile wireless device can separate the "signal" from the "noise" when the mobile wireless device receives sufficiently high quality signals. By using such techniques, the capacity of the control channel can also be increased, i.e. the number of mobile wireless devices that can served simultaneously can be increased. Determining with which mobile wireless device to use MIMO spatial multiplexing can be based on knowledge of the respective received signal quality at the multiple mobile wireless devices. Devices with higher receive signal quality can share the same frequency/time resources more readily than those mobile wireless devices that have lower receive signal quality. Control elements in the radio access subsystem of the wireless network that communicates with the mobile wireless devices can determine to which mobile wireless devices to use MIMO spatial multiplexing (and in which OFDM frequency subchannels and time symbols to use MIMO as well.) The use of MIMO spatial multiplexing on the control channel can be communicated in advance to the mobile wireless devices and can be adapted as receive signal quality changes over time.

These and other embodiments are discussed below with reference to FIGS. 1-10. However, those skilled in the art will readily appreciate that the detailed description given herein with respect to these figures is for explanatory purposes only and should not be construed as limiting.

FIG. 1 illustrates a representative generic wireless communication network 100 that can include multiple mobile wireless devices 102 connected by radio links 126 to radio sectors 104 provided by a radio access network 128. Each radio sector 104 can represent a geographic area of radio coverage emanating from an associated radio node 108 using a radio frequency carrier at a selected frequency. Radio sectors 104 can have different geometric shapes depending on antenna configuration, such as radiating outward in an approximate circle or hexagon from a centrally placed radio node 108 or cone shaped for a directional antenna from a corner placed radio node 108. Radio sectors 104 can overlap in geographic area coverage so that the mobile wireless device 102 can receive signals from more than one radio sector 104 simultaneously. Each radio node 108 can generate one or more radio sectors 104 to which the mobile wireless device 102 can connect by one or more radio links 126.

In some wireless networks 100, the mobile wireless device 102 can be connected to more than one radio sector 104 simultaneously. The multiple radio sectors 104 to which the mobile wireless device 102 is connected can come from a single radio node 108 or from separate radio nodes 108 that can share a common radio controller 110. A group of radio nodes 108 together with the associated radio controller 110 can be referred to as a radio access subsystem 106. Typically each radio node 108 in a radio access subsystem 106 can include a set of radio frequency transmitting and receiving equipment mounted on an antenna tower, and the radio controller 110 connected to the radio nodes 108 can include electronic equipment for controlling and processing transmitted and received radio frequency signals. The radio controller 110 can manage the establishment, maintenance and release of the radio links 126 that connect the mobile wireless device 102 to the radio access network 128. Each mobile wireless device 102 connected to the radio access subsystem 106 can be located at a different distance from the radio node 108 from which it can receive radio frequency signals for the radio links 126. The radio controller 110 and/or the radio node 108 can control monitor and control the strength of transmitted and received signals to each mobile wireless device 102 to manage performance of the radio link 126 connections. The radio access subsystem 106 can use a combination of signal strength, data rate encoding, error correction capability and multiple antenna transmission to improve the performance of signal reception at the mobile wireless device 102 in the presence of variable noise and interference in the wireless network 100.

The radio access network 128, which provides radio frequency air link connections to the mobile wireless device 102, connects also to a core network 112 that can include a circuit switched domain 122, usually used for voice traffic, and a packet switched domain 124, usually used for data traffic. Radio controllers 110 in the radio access subsystems 106 of the radio access network 128 can connect to both a circuit switching center 118 in the circuit switched domain 122 and a packet switching node 120 in the packet switched domain of the core network 112. The circuit switching center 118 can route circuit switched traffic, such as a voice call, to a public switched telephone network (PSTN) 114. The packet switching node 120 can route packet switched traffic, such as a "connectionless" set of data packets, to a public data network (PDN) 116.

Figure 2:
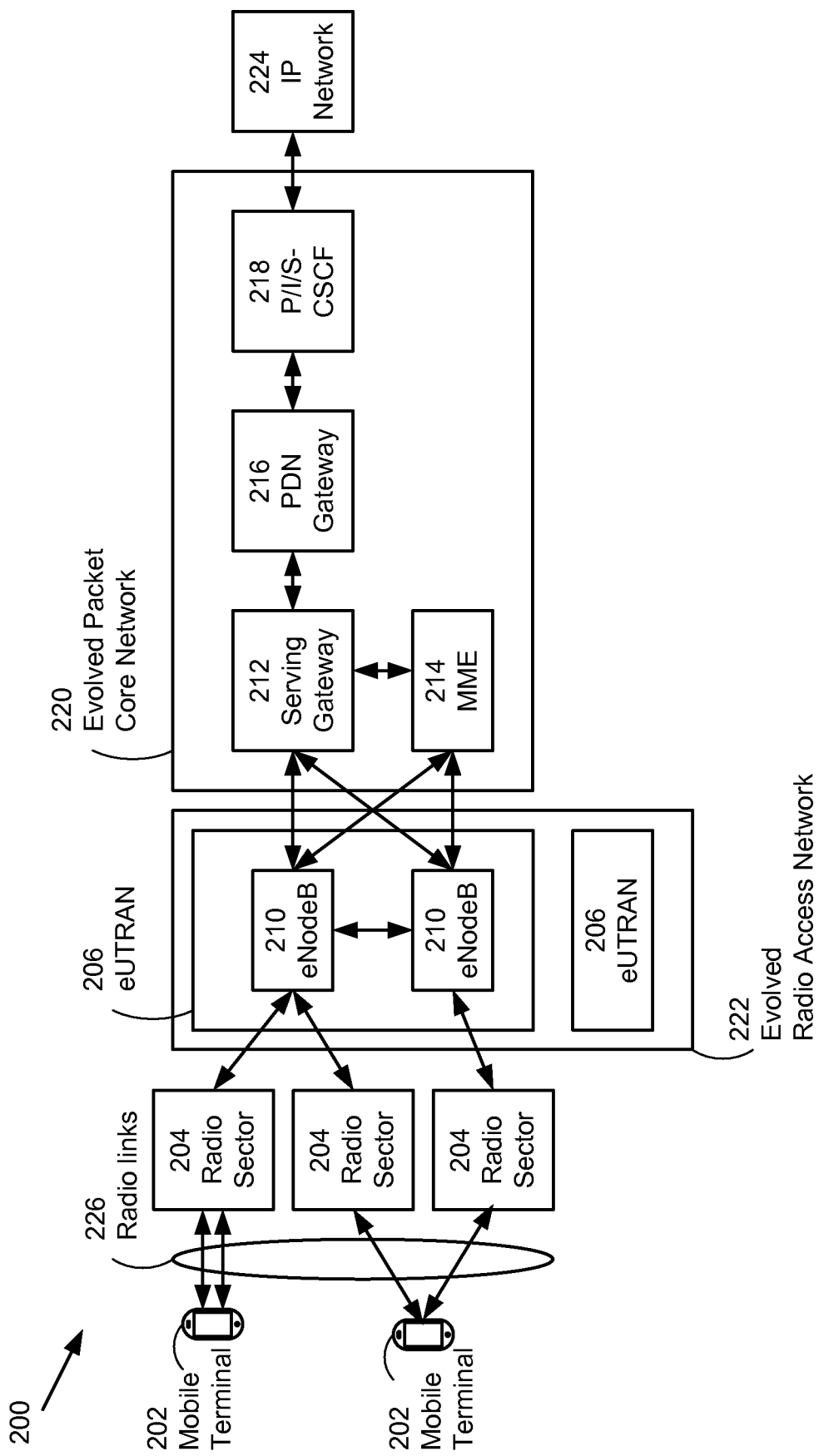
FIG. 2 illustrates components of a LTE wireless communication network.

FIG. 2 illustrates a representative Long Term Evolution (LTE) wireless network 200 architecture designed as a packet switched network exclusively. A mobile terminal 202 can connect to an evolved radio access network 222 through radio links 226 associated with radio sectors 204 that emanate from evolved Node B's (eNodeB) 210. The eNodeB 210 includes the functions of both the transmitting and receiving base stations (such as the radio node 108 in the generic wireless network 100) as well as the radio access network subsystem radio controllers (such as the radio controller 110 in the generic wireless network 100). The equivalent core network of the LTE wireless network 200 is an evolved packet core network 220 including serving gateways 212 that interconnect the evolved radio access network 222 to public data network (PDN) gateways 216 that connect to external internet protocol (IP) networks 218. Multiple eNodeB 210 can be grouped together to form an evolved UTRAN (eUTRAN) 206. The eNodeB 210 can also be connected to a mobility management entity (MME) 214 that can provide control over connections for the mobile terminal 202.

The radio links 226 between the eNodeB 210 in the eUTRAN 206 of the evolved radio access network 222 can include transmissions that use multiple antennas at the transmitting end, at the receiving end and/or at both ends. Transmission and reception using multiple antennas can improve signal reception in the presence of variable noise and interference between the mobile terminal 202 and the eNodeB 210 with the radio sector 204. Multiple antenna transmission can occur in several different forms, including transmit diversity, single user spatial diversity and multiple user spatial diversity. With transmit diversity, the same information can be sent through two different paths, which can provide redundancy for recovering the information at the receiver of the mobile terminal 202. With single user spatial diversity, different information can be sent through two different paths, which provides for increased throughput to an individual mobile terminal 202. With multiple user spatial diversity, different information can be sent to different mobile terminals 202, thereby increasing the aggregate amount of information that can be transmitted to a set of mobile terminals 202. The number of mobile terminals 202 that can served simultaneously by the eUTRAN 206 in the evolved radio access network 222 can depend on the available transmission capacity to send control information to the set of mobile terminals 202. As will be described further herein, the transmission capacity for control information can be increased through spatial diversity by using multiple user multiple input multiple output transmissions with multiple antennas in the LTE network 200.

Transmission on the LTE network 200 can use a form of orthogonal frequency division multiple access (OFDMA) in the downlink direction, i.e. from the eNodeB 210 to the mobile terminal 202, and single carrier frequency division multiple access (SC-FDMA) in the uplink direction. With OFDMA, data can be transmitted on multiple parallel sub-channels, each sub-channel centered at a different sub-carrier frequency, to multiple mobile terminals 202 at the same time. The allocation of sub-channels to the multiple mobile terminals 202 can vary for different OFDM symbols, and control information can be transmitted to the mobile terminals 202 to indicate the allocation of radio frequency resources over time. Each mobile terminal 202 can be allocated a number of sub-channels for a specified period of time, i.e. a set of frequencies across a number of successive OFDM symbols. Allocation of the radio frequency resources can be scheduled by the eNodeB 210 in the eUTRAN 206 of the evolved radio access network 222.

Figure 3:
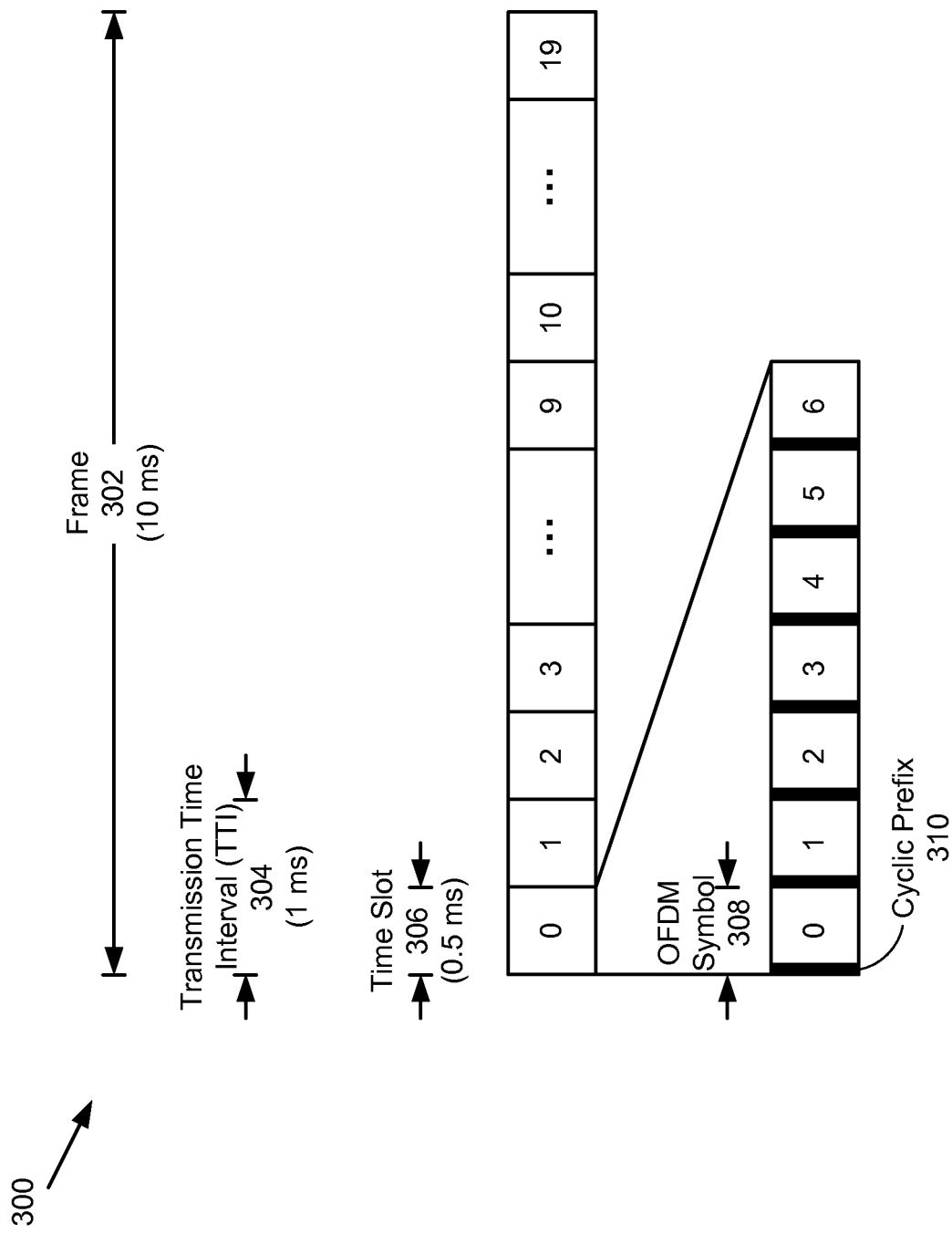
FIG. 3 illustrates components of an OFDM transmission frame in an LTE wireless network.

LTE transmissions can be organized into a succession of OFDM symbols 308 as illustrated in FIG. 3. An LTE frame 302 can span a period of 10 ms and can include 10 transmission timer intervals (TTI) 304 that each span a time period of 1 ms. Each TTI 304 can include two time slots 306 that each span 0.5 ms, and each time slot 306 can include seven OFDM symbols 308. The OFDM symbol 308 as shown in FIG. 3 can include a cyclic prefix 310 that can provide a time domain guard interval to minimize inter-symbol interference between successive OFDM symbols 308.

Figure 4:
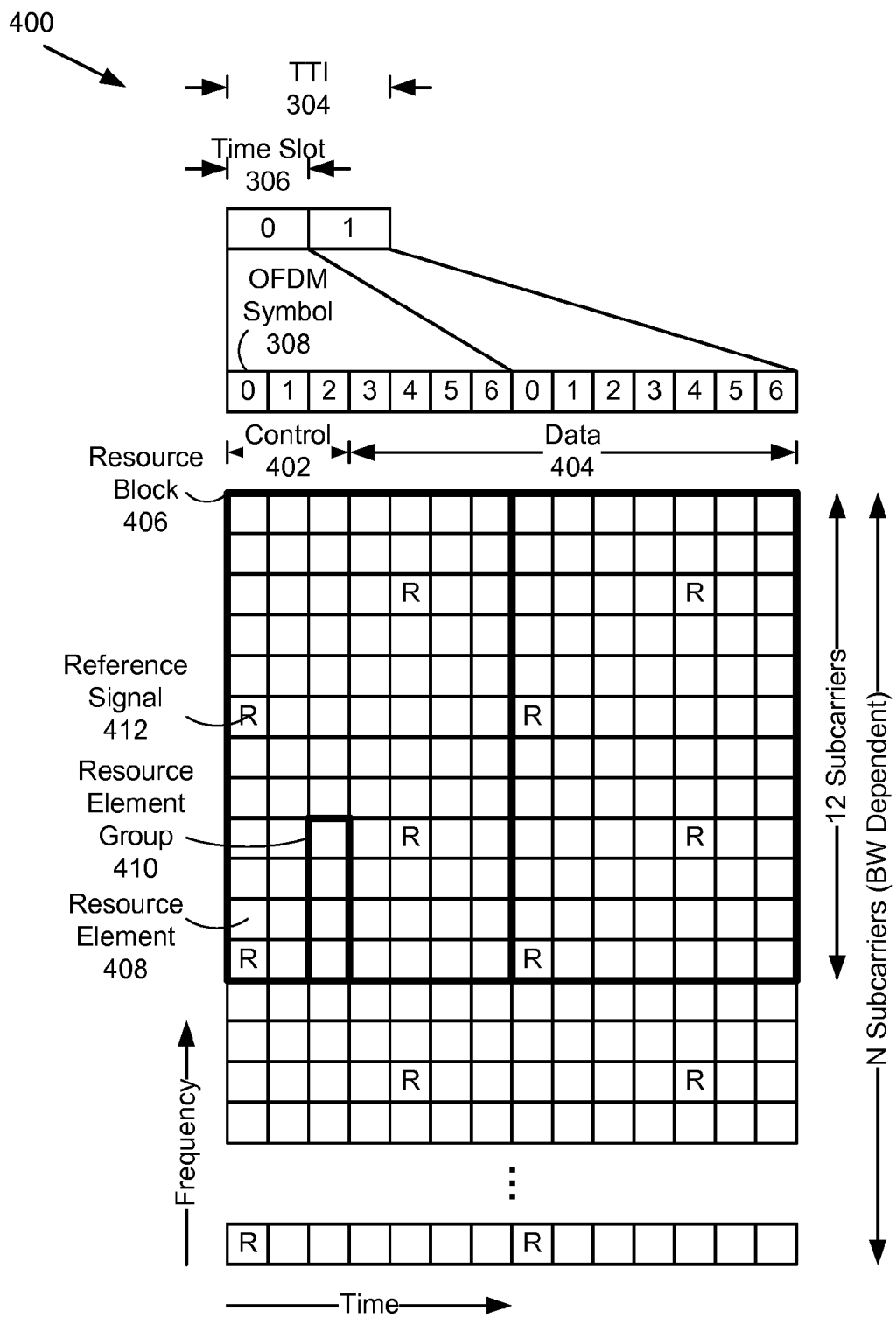
FIG. 4 illustrates constituent components of a transmission time interval for OFDM transmissions in the LTE wireless network.

Each OFDM symbol 308 can include data transmitted on multiple sub-channels, each sub-channel on a separate frequency. An aggregate of a set of sub-channels (sub-carriers) for a set of successive OFDM symbols can be considered a resource block 406 as shown in FIG. 4. In a representative embodiment, the resource block 406 can include a set of twelve adjacent frequency subcarriers during a time slot 306 of seven OFDM symbols 308. Two successive resource blocks can span a transmission time interval (TTI) 306 and can include fourteen OFDM symbols 308 divided into a set of control 402 OFDM symbols and a set of data 404 OFDM symbols. The total number of frequency sub-carriers used for an OFDM symbol can depend on the bandwidth allocated. With a sub-carrier spacing of 15 kHz, each resource block 406 can span 180 kHz of bandwidth, and the total bandwidth occupied can depend on the number of available resource blocks 406. For example, an LTE transmission system that uses fifty resource blocks 406 can span a bandwidth of 9 MHz (lowest to highest sub-carrier center frequency) and can fit within a 10 Mhz radio frequency total bandwidth (including side lobes).

Each transmission on a single frequency subcarrier within a single OFDM symbol 308 can be considered an individual resource element (RE) 408 of a physical layer transmission. In general, the RE 408 can be referred to as a frequency/time resource. The resource elements 408 in the data portion 404 of a TTI 304 can be allocated among multiple mobile terminals 202, and the allocation of the RE 408 can be communicated to the mobile terminals 202 using resource elements 408 in the control portion 402 of the TTI 304. Four different resource elements 408 within a single OFDM symbol 308 can form a resource element group (REG) 410, and nine different REGs 410 can form a control channel element (CCE). A physical downlink control channel (PDCCH) message in the LTE transmission system to one of the mobile terminals 202 can use one, two, four or eight CCEs depending on a format selected for the PDCCH message. The PDCCH message format can be based on received downlink signal quality conditions measured at the mobile terminal 202 and reported to the eNodeB 210 of the LTE wireless network 200. With a high receive signal quality at the mobile terminal 202, one CCE can suffice for the PDCCH message, while with a low receive signal quality, up to eight CCE can be required to minimize decoding errors of the PDCCH message at the mobile terminal 202.

The total number of mobile terminals 202 that can be supported simultaneously in a given TTI 304 can depend on the available signal quality at each of the mobile terminals 202 and on the number of OFDM symbols 308 available for control channel transmission. For each TTI 304, a total of fourteen OFDM symbols 308 can be available and can be divided between control transmission and data transmission. One, two or three OFDM symbols 308 of the fourteen total OFDM symbols 308 in the TTI 304 can be used for control 402, while the remaining OFDM symbols 308 in the TTI 304 can be used for data 404. Some of the resource elements 408 in each resource block 406 can be reserved to carry reference signals 412, as indicated by select RE 408 labeled with the letter "R" in the resource block 408 of FIG. 4. The reference signal 412 resource elements 408 can provide a pre-determined known signal to which the mobile terminal 202 can locate and synchronize as well as characterize the downlink communication channel to the mobile terminal 202 from the eNodeB 210 in the evolved radio access network 222 of the wireless network 200. Within a resource block 406, which can have three OFDM symbols available for control 402 channel transmissions, two of the thirty six resource elements 408 can be used for reference signals 412. As a minimum allocation of one CCE (36 RE) can be required for control channel communication for each mobile terminal 202 for a given TTI 304, even with three OFDM symbols 308 assigned for transmission of control 402 information, a maximum of less than fifty independent mobile terminals 202 can be accommodated in an LTE transmission system that occupies 10 MHz of frequency bandwidth. Each mobile terminal 202 that requires more than one CCE for control channel transmissions, i.e. when a mobile terminal 202 can have poor receive radio frequency signal quality and can require 2, 4 or 8 CCE, can reduce the total number of mobile terminals 202 that can be supported simultaneously per TTI 304. As LTE systems can be expected to transport both high speed data and numerous lower rate voice connections, increasing the number of mobile terminals 202 that can be simultaneously supported in each TTI 304 can prove beneficial.

Figure 5:
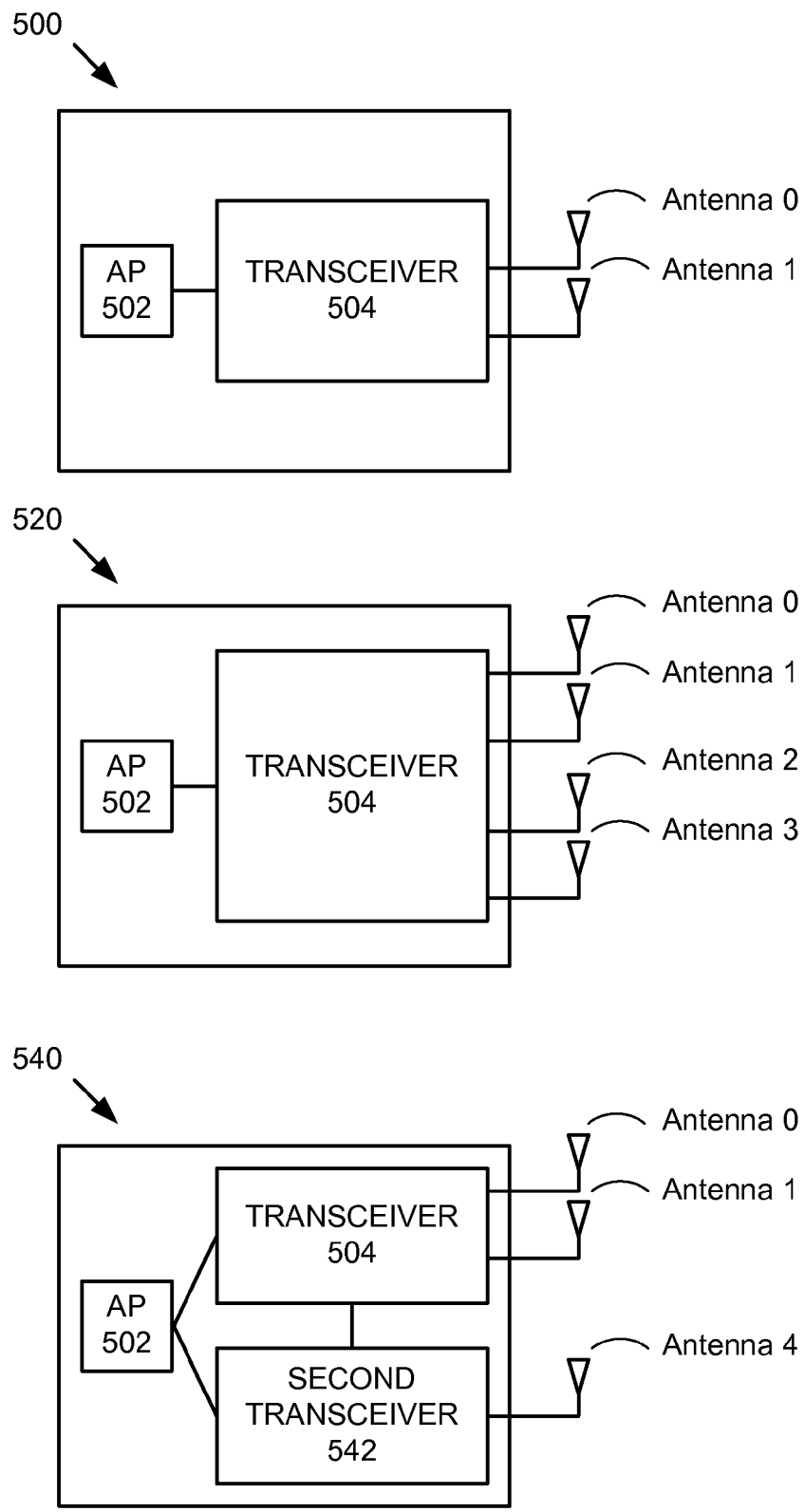
FIG. 5 illustrates several architectures for select components in a mobile wireless device that supports receive diversity.

FIG. 5 illustrates select elements for several different architectures that can be used in a mobile wireless device 102 (or mobile terminal 202). A mobile terminal 202 can include multiple antennas to improve downlink received signal performance, such as increased robustness in the presence of noise and interference as well as higher data rates. The architecture for a mobile terminal 202 can include an application processor (AP) 502, one or more transceivers and multiple antennas. In a first architecture 500, the mobile terminal 202 can include one transceiver 504 connected to the AP 502 and also connected to two antennas. The AP 502 of the mobile terminal 202 can initiate and terminate connections with the wireless network 200 in response to application level services active in the mobile terminal 202. The AP 502 can provide "higher layer" processing that can establish packet level connections through the wireless network 200, while the transceiver 504 can provide "lower layer" signal processing that can translate the higher layer packet messages into a format suitable for transmission over the radio links 226 in the radio sector 204 supported by the eNodeB 210 of the eUTRAN 206 in the evolved radio access network 222. The transceiver 504 can receive downlink transmissions from the eNodeB 210 through one of the two antennas, e.g. by selecting among the antennas having a stronger signal strength or a higher signal quality, or through both antennas simultaneously and combine the received signals to improve signal reception.

In a basic form of diversity, the mobile terminal 202 with configuration 500 can receive signals transmitted by a single antenna at the eNodeB 210 through one of the antennas, either antenna 0 or antenna 1, where the antenna used is switched into service by the mobile terminal 202 (switch not shown). This form of diversity can be considered "antenna diversity" in which one of the antennas can provide better performance, e.g. based on signal strength and/or signal quality, and the antenna used can be chosen dynamically for a connection. Alternatively, when the transceiver 504 in the mobile terminal 202 can process signals from both antennas simultaneously, the transceiver 504 can combine signals transmitted on each of the different frequency sub-channels in an OFDM symbol to improve signal strength and/or signal quality throughout a received frequency spectrum. This combining of signals received through multiple antennas simultaneously can be considered "receiver diversity". With these basic forms of diversity, the receive signal quality reported to the eNodeB 210 in the wireless network 200 can be higher than without diversity, and the number of CCE assigned for PDCCH transmissions can be lower, thereby freeing up some CCE to be used for other mobile terminals 202.

A more advanced form of diversity can use simultaneous transmission through multiple antennas at the eNodeB 210 and simultaneous reception through multiple antennas at the mobile terminal 202. This form of diversity can be referred to as multiple input multiple output (MIMO) transmission and can be used to increase transmission data rates to a single mobile terminal 202, i.e. single user (SU) MIMO or to transmit data simultaneously to multiple mobile terminals 202, i.e. multiple user (MU) MIMO. Sharing the same frequency/time resources using MU MIMO across multiple mobile terminals 202 can increase the number of mobile terminals 202 that can be served simultaneously by the limited number of CCE available per TTI 304, thereby increasing the capacity of control channel communication in the LTE system. The number of transmit and receive antennas used for MIMO can be two, as shown for the architecture 500, as well as four as shown for architecture 520 or even more (not shown). The LTE and LTE-Advanced communication protocols include options for one, two, four and eight antenna configurations. The mobile terminal 202 can determine the number of transmit antennas used by the eNodeB 210 in the wireless network 200 by using the transmitted reference signals 412.

While the description herein covers several different architectures for mobile terminals 202 that can use multiple antennas with one or more transceivers, some mobile wireless devices 102 can include multiple receivers to support connections to wireless networks that offer different wireless communication protocols. The evolution of wireless network deployment can result in periods of overlapping technologies that use different wireless communication protocols that can require different transceivers. The architecture 540 for a mobile wireless terminal 102 shown in FIG. 4 includes a first transceiver 504 that can support multiple antenna communication and a second transceiver 542 that can support single antenna communication. The description provided herein outlined in terms of a mobile wireless terminal 102 having multiple antennas and a single transceiver block 504 can apply equally to dual transceiver mobile wireless terminals 102. In some embodiments, the single transceiver block 504 can also include multiple parallel transceivers or configurable blocks that can support reception through multiple antennas in parallel. No loss of generality is intended by the depiction of a "single" transceiver block 504 as shown for architecture 504 of the mobile wireless terminal 102 in FIG. 5.

Figure 6:
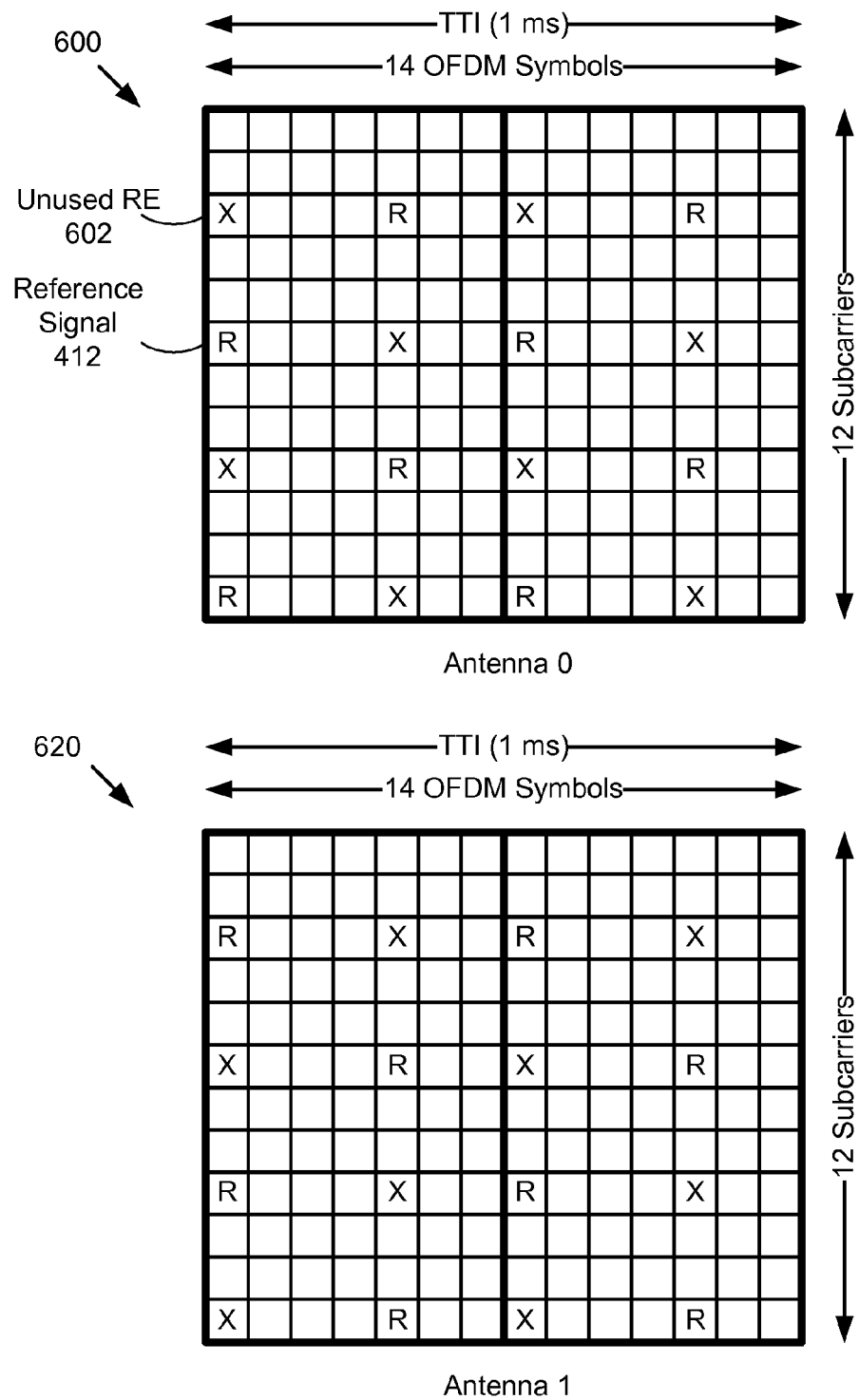
FIG. 6 illustrates an organization of resource elements for transmission on multiple antennas within a transmission time interval across multiple subcarriers.

With MIMO transmission, the eNodeB 210 in the wireless network 200 can send signals through multiple antennas. FIG. 6 illustrates how reference signals 412 can be divided between two different antennas of the eNodeB 210. The resource blocks 610 for one TTI 304 output by a first antenna 0 can include reference signals 412 in select frequency/time resource elements 408 and can exclude sending signals in other resource elements 408 (labeled as "unused" RE 602). Similarly the resource blocks 620 for one TTI 304 output by a second antenna 1 can include reference signals 412 in the same frequency/time resource elements 408 that were "unused" by the first antenna 0. Thus, distinct reference signals 412 can be transmitted by each antenna, and the mobile terminal 202 can measure transmission channel characteristics for each antenna separately using the distinct reference signals 412.

Figure 7:
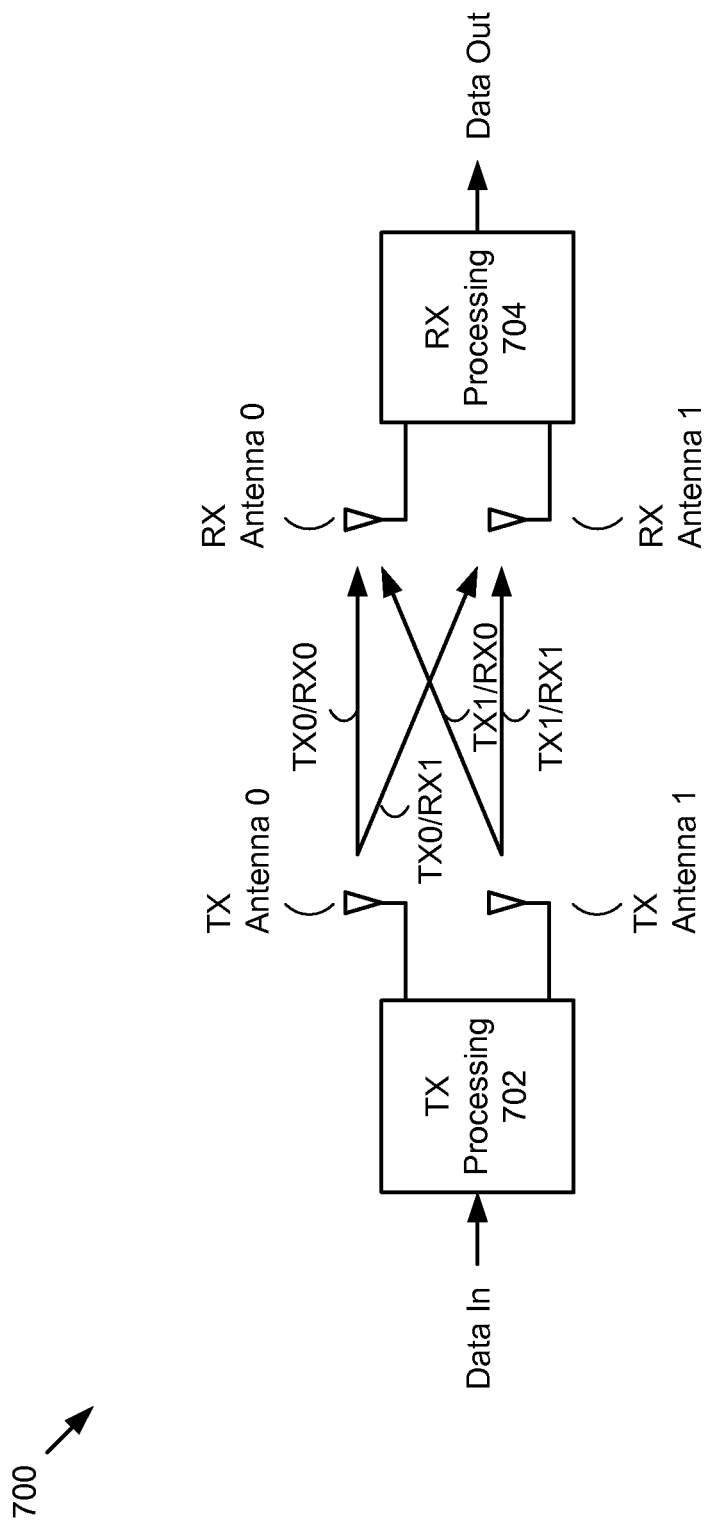
FIG. 7 illustrates transmission paths for a multiple input multiple output transmission.

FIG. 7 illustrates four distinct transmission paths that can be characterized by the mobile terminal 202 using reference signals 412 sent from transmit (TX) processing 702 at the eNodeB 210. Receive (RX) processing 704 in the mobile terminal 202 can be used to receive reference signals 412 transmitted by TX antenna 0 at the eNodeB 210 through each of the receive antennas separately. The TX0/RX0 transmission path can be characterized separately from the TX0/RX1 transmission path by the RX processing 704 of the mobile terminal 202 using reference signals 412 transmitted in specific time/frequency resource elements 408 by the TX antenna 0. Similarly the TX1/RX1 and TX1/RX0 transmission paths can be characterized separately using reference signals 412 transmitted in a different set of frequency/time resource elements 408 by the TX antenna 1 to RX antenna 0 and RX antenna 1. As the reference signals from TX antenna 0 and TX antenna 1 can be sent in separate time/frequency resource elements 408 as shown in FIG. 6, the separate transmission paths can be characterized independently. Once the transmission paths are characterized, constituent component transmissions for each of two different transmitting antennas can be determined from the linear combinations of the transmitted signals received at each antenna. MIMO transmission as shown in FIG. 7 can be used to increase the amount of information transmitted to an individual mobile terminal 202 by sending twice the amount of data using the two transmitting antennas simultaneously for the same frequency/time resource element. MIMO transmission can also be used to transmit to two different mobile terminals 202, e.g. by increasing the data throughput rate, with half of the data used for one mobile terminal 202 and the other half of the data used for another mobile terminal 202 simultaneously.

The LTE and LTE-Advanced communication protocols specify several different MIMO transmission methods that can be applied to downlink data channels; however, for downlink control channels only a transmit diversity method is specified. Transmit diversity can improve signal integrity but does not directly share the same frequency/time radio frequency resource element between multiple users. By applying MU MIMO for control channel communication from the eNodeB 210, the wireless network 200 can increase the capacity of the control channel and thereby serve more mobile terminals 202 simultaneously. Using MU MIMO and two spatially separated transmitting antennas, the eNodeB 210 can transmit two parallel control channel data streams simultaneously to two different mobile terminals 202 sharing the same frequency/time resource elements. Each of the parallel control channel data streams can be separately encoded so that control channel data intended for one mobile terminal 202 can be separated from control channel data intended for another mobile terminal 202. This encoding at the eNodeB 210 can be referred to as "precoding" and can map control channel data streams into suitable control channel data symbols for transmission by the multiple antennas.

In a representative embodiment, the control channel data stream for one mobile terminal 202 can be precoded using one "rank 1" vector, while the control channel data stream for a second mobile terminal 202 can be precoded using a separate "rank 1" vector. A representative set of four different "rank 1" vectors from which to select precoding vectors for each mobile terminal 202 can include the following complex valued vectors:

$$\left\{ \frac{1}{\sqrt{2}} \begin{bmatrix} 1 \\ 1 \end{bmatrix}, \frac{1}{\sqrt{2}} \begin{bmatrix} 1 \\ -1 \end{bmatrix}, \frac{1}{\sqrt{2}} \begin{bmatrix} 1 \\ j \end{bmatrix}, \frac{1}{\sqrt{2}} \begin{bmatrix} 1 \\ -j \end{bmatrix} \right\},$$

where the upper entry in each vector can signify the precoding applied for data transmitted on a first antenna and the lower entry in each vector can signify the precoding applied for data transmitted on a second antenna. Each mobile terminal 202 in a set of mobile terminals that can share frequency/time resources through MU MIMO can be assigned a different one of the precoding vectors and can use that knowledge to correctly decode signals received through its two antennas and to reconstruct its own intended original data stream. When using four transmit antennas, the set of precoding vectors can include vectors of length four instead of length two as shown above for two transmit antennas.

Figure 8:
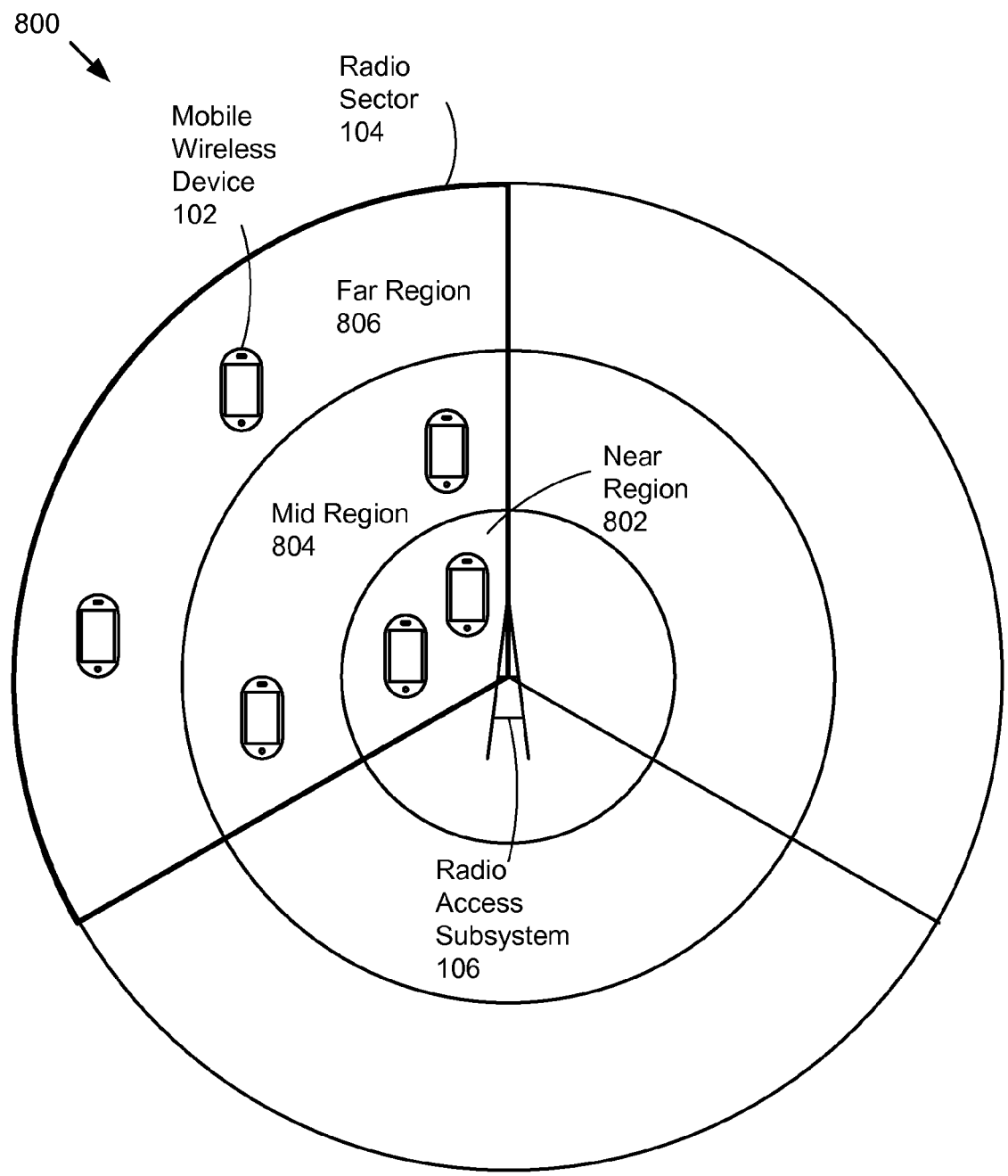
FIG. 8 illustrates multiple mobile wireless devices arrayed in a radio sector for a radio access subsystem in the LTE wireless network.

FIG. 8 illustrates a partition 800 of a radio sector 104 for a wireless network 100 into three distinct regions nominally based on distance from a radio access subsystem 106 of the wireless network 100. A set of mobile wireless devices 102 in a far region 806 can be located at a farthest distance from the radio access subsystem 106, and signals transmitted by the radio access subsystem 106 to a mobile wireless device 102 in the far region 806 can incur significant amounts of attenuation. As such, mobile wireless devices 102 in the far region can have the weakest receive signal strength and/or the weakest signal quality of mobile wireless devices 102 served by the radio access subsystem 106 in the radio sector 104 of the wireless network 100. As mobile wireless devices 102 can report periodically a channel quality indicator (CQI) to the radio access subsystem 106, and the radio access subsystem 106 can categorize the mobile wireless devices 102 based on the CQI (or other performance information) to determine the number of CCE to assign for a downlink control channel (e.g. the physical downlink control channel PDCCH) to each mobile wireless device 102 served by the radio access subsystem 106.

For mobile wireless devices with a relatively high signal strength and/or high signal quality, e.g. located in a near region 802 relatively close to the radio access subsystem 106, a minimum of only one CCE can be used for the control channel information. As the number of mobile wireless devices 102 in the radio sector that can be served simultaneously can be limited by the total number of CCE available, the radio access subsystem 106 can group together one or more sets of mobile wireless devices 102 located in the near region 802 of the radio sector 104. Each mobile wireless device 102 in the set can have comparable signal strength and/or signal quality and can share one CCE among of the set of mobile wireless devices 102 in the near region 802 using MU MIMO transmission for the control channel information. When transmitting from the radio access system 106 with two antennas to mobile wireless devices 102 having two antennas, the radio access subsystem 106 can pair up mobile wireless devices 102 in the near region 802 in sets of two mobile wireless devices 102 with comparable signal strength/quality. When transmitting with four antennas to mobile wireless devices 102 that can receive MU MIMO transmissions with four antennas, the radio access subsystem 106 can group the mobile wireless devices 102 in the near region 802 into sets of up to four mobile wireless devices 102 to share a single CCE.

The radio access subsystem 106 can use different strategies to add control channel capacity with MU MIMO transmission depending on one or more factors such as the number of mobile wireless devices 102 associated with the radio access subsystem 106, the number of mobile wireless devices 102 actively connected to the radio access subsystem 106, the number of transmit antennas at the radio access subsystem 106, the number of receive antennas at each of the mobile wireless devices 102, measured receive signal strength and/or signal quality communicated from each mobile wireless device 102 to the radio access subsystem 106, and selection and use of MU MIMO on data channels for a particular mobile wireless device 102.

Figure 9:
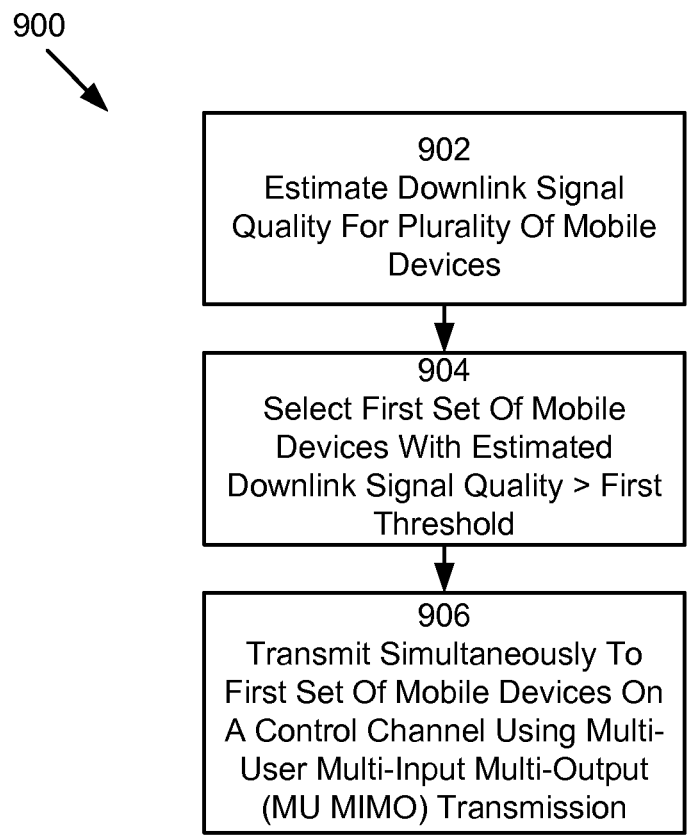
FIG. 9 illustrates a representative method to increase transmission capacity for a control channel in a wireless network.

FIG. 9 illustrates a representative method 900 to increase transmission capacity for a control channel in a wireless network 100. The method can be executed at a radio node 108 in a radio access network 128 of the wireless network 100. In step 902, the radio node 108 can estimate downlink signal quality for a plurality of mobile wireless devices 102. In a representative embodiment, the downlink signal quality can be reported by one or more of the plurality of mobile wireless devices 102 to the radio node 108 using channel quality feedback indicators. In step 904, the radio node 108 can select a set of mobile wireless devices 102 each having an estimated downlink signal quality that exceeds a first pre-determined threshold. In a representative embodiment, the first pre-determined threshold can be set the wireless network 100 and can be communicated to the mobile wireless device 102. In step 906, the radio node 108 can transmit simultaneously to the set of mobile wireless devices 102 on the control channel using MU MIMO transmission. In a representative embodiment, at least two of the mobile wireless devices 102 in the set of mobile wireless devices 102 can be assigned to a common control channel element (CCE) that occupies a set of time and frequency resource elements during a transmission time interval for the control channel. The transmission capacity of the control channel can be limited by the number of control channel elements that can be scheduled for each transmission time interval. In a representative embodiment, the radio node can transmit an indication to the mobile wireless device 102 when MU MIMO transmission is used for transmission of the control channel. The number of mobile wireless devices 102 that share a common CCE using MU MIMO transmission can depend on the estimated receive downlink signal quality. Higher receive downlink signal quality can support sharing of the common CCE among more mobile wireless devices 102 simultaneously than lower receive downlink signal quality.

Figure 10:
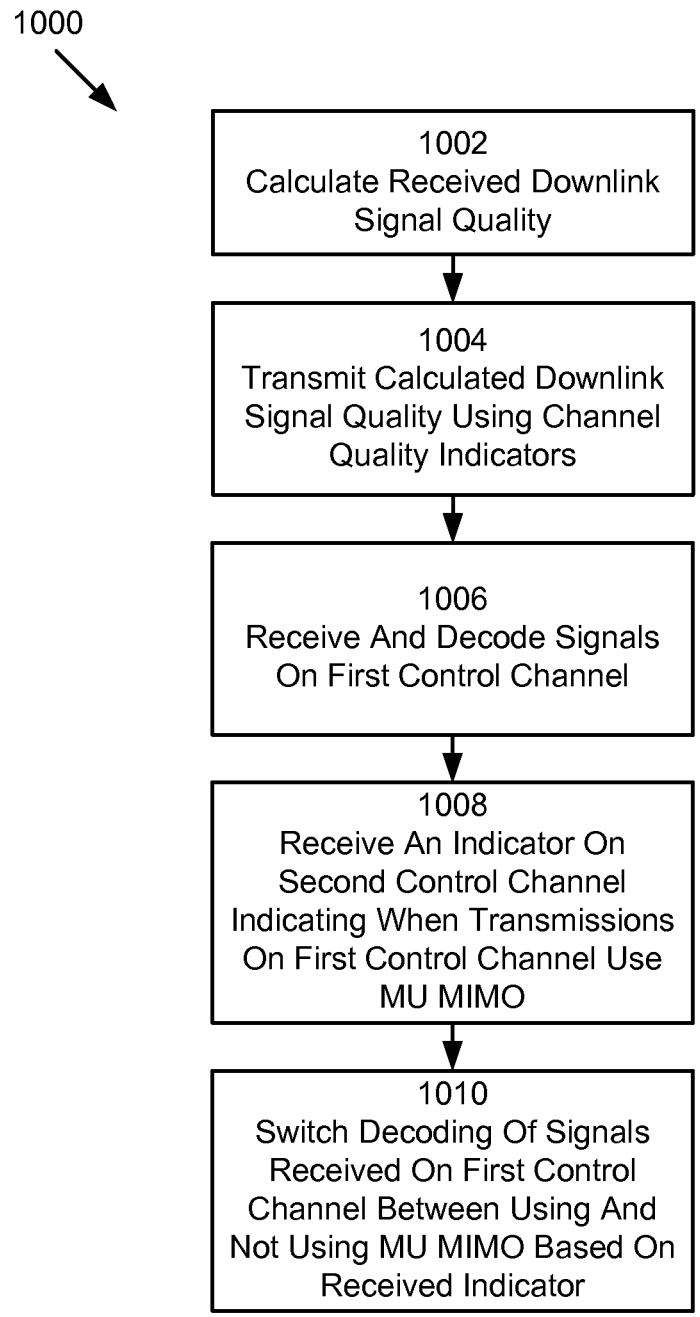
FIG. 10 illustrates another representative method to increase transmission capacity for a control channel in a wireless network.

FIG. 10 illustrates another representative method 1000 to increase transmission capacity for a control channel in a wireless network 100. The method can be executed at a mobile wireless device 102 in the wireless network 100. In step 1002, the mobile wireless device 102 can calculate a received downlink signal quality. In step 1004, the mobile wireless device 102 can transmit the calculated downlink signal quality using channel quality indicators to a radio node 108 in the wireless network 100. In step 1006, the mobile wireless device 102 can receive and decode signals on a first control channel. In step 1008, the mobile wireless device 102 can receive an indicator on a second control channel that can indicate when transmissions on the first control channel can use MU MIMO. In step 1010, the mobile wireless device can switch decoding of signals received on the first control channel between using and not using MU MIMO based on the received indicator from the wireless network 100. In a representative embodiment, the mobile wireless device 102 can receive from the wireless network 100 notification of an assigned rank one pre-coding matrix used for MU MIMO transmission on the first control channel. The mobile wireless device 102 can decode the signals received on the first control channel using the assigned rank one pre-coding matrix.

In a representative embodiment, the first control channel, on which the mobile wireless device 102 can receive MU MIMO transmissions, and the second control channel, on which the mobile wireless device 102 can receive indications when transmissions on the first control channel use MU MIMO transmissions, can be the same physical control channel. An exemplary physical control channel can be the PDCCH control channel. The mobile wireless device 102 can receive the physical control channel initially without using MU MIMO and can switch to using MU MIMO based on a message transmitted in the physical control channel. The message can indicate a switch to MU MIMO transmission at a particular frame. Messages in the physical control channel can use MU MIMO transmission from that particular indicated frame onward until a subsequent message can indicate a switch to not use MU MIMO transmission. In another embodiment, the mobile wireless device 102 can detect when MU MIMO transmission is used and can appropriately decode the received transmissions on the PDCCH control channel based on the detection. In another embodiment, the mobile wireless device 102 can decode transmissions on the PDCCH control channel trying different transmission modes, such as with MU MIMO and without MU MIMO, to achieve a best decoding of the PDCCH control channel.

In another representative embodiment, the first control channel and the second control channel can be separate physical control channels. Separate physical control channels can be, for example, a first PDCCH and a second PDCCH. Messages on the first control channel can switch between using and not using MU MIMO based on messages transmitted on the second control channel. The second control channel can use a fixed transmission method with high reliability, such as with transmission diversity.

In another representative embodiment, the first control channel and the second control channel can be separate logical channels on the same physical control channel. Separate logical channels can be two different logical channels that share the same PDCCH. A PDCCH can use multiple control channel elements (CCEs) that span multiple time/frequency resource elements, a two different blocks of time/frequency resource elements that are used by the PDCCH can be grouped into separate control channels (effectively separate control sub-channels within the PDCCH control channel).

The various aspects, embodiments, implementations or features of the described embodiments can be used separately or in any combination. Various aspects of the described embodiments can be implemented by software, hardware or a combination of hardware and software.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

The advantages of the embodiments described are numerous. Different aspects, embodiments or implementations can yield one or more of the following advantages. Many features and advantages of the present embodiments are apparent from the written description and, thus, it is intended by the appended claims to cover all such features and advantages of the invention. Further, since numerous modifications and changes will readily occur to those skilled in the art, the embodiments should not be limited to the exact construction and operation as illustrated and described. Hence, all suitable modifications and equivalents can be resorted to as falling within the scope of the invention.

What is claimed is:

1. A method to increase a transmission capacity for a control channel in a wireless network, the method comprising:
    at a radio node in a radio access network of the wireless network:
        estimating a received downlink signal quality for each mobile wireless device in a plurality of mobile wireless devices connected to the radio node;
        categorizing the plurality of mobile wireless devices into a plurality of sets based on the estimated received downlink signal quality for each mobile device;
        determining for each of the sets an available number of common control channel elements to assign for the control channel based on a number of mobile wireless devices in each set;
        selecting a first set of mobile wireless devices in the plurality of mobile wireless devices, each selected mobile wireless device having an estimated downlink signal quality exceeding a first predetermined threshold; and
        transmitting simultaneously to the first set of mobile wireless devices that share a first common control channel element on the control channel through a plurality of antennas using multi-user (MU) multiple-input multiple-output (MIMO) transmission.

2. The method as recited in claim 1, further comprising:
    at the radio node:
        assigning at least two mobile wireless devices in the first set of mobile wireless devices to the first common control channel element that occupies a first set of time and frequency resource elements in a transmission time interval;
        wherein the transmission capacity of the control channel is limited by the number of control channel elements scheduled for each transmission time interval.

3. The method as recited in claim 1, further comprising:
    at the radio node:
        receiving downlink signal quality indicators from each of the plurality of mobile wireless devices; and
        estimating the downlink signal quality to each mobile wireless device based on at least the received downlink signal quality indicator from the mobile wireless device.

4. The method as recited in claim 1, further comprising:
at the radio node:
assigning a unique rank one pre-coding matrix used for MU MIMO transmission on the control channel to each mobile wireless device in the first set of mobile wireless devices; and
notifying each mobile wireless device of the assigned rank one pre-coding matrix.

5. The method as recited in claim 4, further comprising:
transmitting an indicator on a separate second control channel to each mobile wireless device when MU MIMO is used for transmission on the first control channel.

6. The method as recited in claim 1, wherein the wireless network uses a 3GPP LTE or LTE-Advanced communications protocol.

7. The method as recited in claim 1, wherein the number of mobile wireless devices in the first set of mobile wireless device depends on the estimated downlink signal quality for the mobile wireless devices in the first set of mobile wireless devices.

8. The method as recited in claim 2, further comprising:
assigning at least two mobile wireless devices in the first set of mobile wireless devices to an second control channel element that occupies a second set of time and frequency resource elements in the transmission time interval.

9. The method as recited in claim 8, wherein the number of mobile wireless devices assigned to the first control channel element equals the number of mobile wireless devices assigned to the second control channel element.

10. The method as recited in claim 9, further comprising:
at the radio node:
selecting a second set of mobile wireless devices in the plurality of mobile wireless devices, each selected mobile wireless device having an estimated downlink signal quality that exceeds a second threshold and falls below the first threshold;
transmitting simultaneously to the second set of mobile wireless devices on the control channel through the plurality of antennas using MU MIMO transmission; and
assigning at least two mobile wireless devices in the second set of mobile wireless devices to a third control channel element that occupies a third set of time and frequency resource elements in the transmission time interval;
wherein the number of mobile wireless devices in the first set of mobile wireless devices assigned to the first control channel element exceeds the number of mobile wireless devices in the third set of mobile wireless devices assigned to the third control channel element.

11. A mobile wireless device comprising:
a receiver configured to:
receive and decode signals transmitted on a first control channel, wherein a transmission capacity on the first control channel is limited by a number of common control channel elements scheduled for each transmission time interval;
receive an indicator, transmitted on a separate second control channel, that indicates when transmissions on the first control channel are encoded using MU MIMO transmission; and
switch decoding of signals received on the first control channel between using and not using MU MIMO transmission based on the received indicator; and
a processor configured to:
calculate a downlink signal quality for transmissions received from a radio node in a wireless network;
transmit the calculated downlink signal quality using channel quality indicators to the radio node in the wireless network;
wherein the wireless network categorizes the mobile wireless device into a first set of a plurality of sets based on the calculated downlink signal quality and determines to use MU MIMO transmission on the first control channel based at least in part on the communicated calculated downlink signal quality, and
wherein the mobile wireless device shares a first common control channel element with at least a further mobile wireless device of the first set in the wireless network.

12. The mobile wireless device as recited in claim 11, wherein the wireless network uses a 3GPP LTE or LTE-Advanced communications protocol.

13. The mobile wireless device as recited in claim 11, wherein the receiver is further configured to:
receive from the wireless network notification of an assigned unique rank one pre-coding matrix used for MU MIMO transmission on the first control channel, and
decode the signals received on the first control channel using the assigned rank one pre-coding matrix.

14. A computer program product encoded in a non-transitory computer readable medium for increasing a transmission capacity for a control channel in a wireless network, the computer program product when executed by a processor causes the processor to perform operations, comprising:
at a radio node in a radio access network of the wireless network:
estimating a received downlink signal quality for each mobile wireless device in a plurality of mobile wireless devices connected to the radio node;
categorizing the plurality of mobile wireless devices into a plurality of sets based on the estimated received downlink signal quality for each mobile device;
determining for each of the sets an available number of common control channel elements to assign for the control channel based on a number of mobile wireless devices in each set;
selecting a first set of mobile wireless devices in the plurality of mobile wireless devices, each selected mobile wireless device having an estimated downlink signal quality exceeding a first predetermined threshold; and
transmitting simultaneously to the first set of mobile wireless devices on the control channel through a plurality of antennas using multi-user (MU) multiple-input multiple-output (MIMO) transmission.

15. The computer program product as recited in claim 14, wherein when executed by the processor causes the processor to perform operations further comprising:
at the radio node:
assigning at least two mobile wireless devices in the first set of mobile wireless devices to the first control channel element that occupies a first set of time and frequency resource elements in a transmission time interval;
wherein the transmission capacity of the control channel is limited by the number of control channel elements scheduled for each transmission time interval.

16. The computer program product as recited in claim 14, wherein when executed by the processor causes the processor to perform operations further comprising:
at the radio node:
receiving downlink signal quality indicators from each of the plurality of mobile wireless devices; and
estimating the downlink signal quality to each mobile wireless device based on at least the received downlink signal quality indicator from the mobile wireless device.

17. The computer program product as recited in claim 14, wherein when executed by the processor causes the processor to perform operations further comprising:
at the radio node:
assigning a unique rank one pre-coding matrix used for MU MIMO transmission on the control channel to each mobile wireless device in the first set of mobile wireless devices; and
notifying each mobile wireless device of the assigned rank one pre-coding matrix.

18. The computer program product as recited in claim 17, wherein when executed by the processor causes the processor to perform operations further comprising:
transmitting an indicator on a separate second control channel to each mobile wireless device when MU MIMO is used for transmission on the first control channel.

19. The computer program product as recited in claim 14, wherein the wireless network uses a 3GPP LTE or LTE-Advanced communications protocol.

20. The computer program product as recited in claim 14, wherein the number of mobile wireless devices in the first set of mobile wireless device depends on the estimated downlink signal quality for the mobile wireless devices in the first set of mobile wireless devices.

21. The computer program product as recited in claim 15, wherein when executed by the processor causes the processor to perform operations further comprising:
assigning at least two mobile wireless devices in the first set of mobile wireless devices to an second control channel element that occupies a second set of time and frequency resource elements in the transmission time interval;
wherein the number of mobile wireless devices assigned to the first control channel element equals the number of mobile wireless devices assigned to the second control channel element.

22. The computer program product as recited in claim 21, wherein when executed by the processor causes the processor to perform operations further comprising:
selecting a second set of mobile wireless devices in the plurality of mobile wireless devices, each selected mobile wireless device having an estimated downlink signal quality that exceeds a second threshold and falls below the first threshold;
transmitting simultaneously to the second set of mobile wireless devices on the control channel through the plurality of antennas using MU MIMO transmission; and
assigning at least two mobile wireless devices in the second set of mobile wireless devices to a third control channel element that occupies a third set of time and frequency resource elements in the transmission time interval;
wherein the number of mobile wireless devices in the first set of mobile wireless devices assigned to the first control channel element exceeds the number of mobile wireless devices in the third set of mobile wireless devices assigned to the third control channel element.

* * * * *